US012732002B2

(12) United States Patent
Khalfet et al.

(10) Patent No.: US 12,732,002 B2
(45) Date of Patent: Sep. 8, 2026

(54) VOLTAGE SOURCE INVERTER AND POWER GENERATION SYSTEM

(71) Applicant: SMA Solar Technology AG, Niestetal (DE)

(72) Inventors: Chokri Khalfet, Kassel (DE); Mohamed Khshainy, Kassel (DE); Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 19/041,063

(22) Filed: Jan. 30, 2025

(65) Prior Publication Data

US 2025/0175011 A1 May 29, 2025

Related U.S. Application Data

(63) Continuation of application No. PCT/EP2023/071899, filed on Aug. 8, 2023.

(30) Foreign Application Priority Data

Aug. 8, 2022 (DE) ..................... 10 2022 119 897.9

(51) Int. Cl.
*H02J 3/46* (2026.01)
*H02J 3/388* (2026.01)
(Continued)

(52) U.S. Cl.
CPC ................ *H02J 3/46* (2013.01); *H02J 3/388* (2020.01); *H02M 1/0025* (2021.05); *H02M 7/493* (2013.01)

(58) Field of Classification Search
CPC .......... H02J 3/388; H02J 3/46; H02M 1/0025; H02M 7/493
(Continued)

(56) References Cited

U.S. PATENT DOCUMENTS 11,409,316 B2 8/2022 Knobloch
2010/0142237 A1 6/2010 Yuan et al.
(Continued)

FOREIGN PATENT DOCUMENTS

WO 2019170479 A1 9/2019
WO 2021115702 A1 6/2021
WO 2022013458 A1 1/2022

OTHER PUBLICATIONS

International Search Report dated Nov. 17, 2023, for International Application No. PCT/EP2023/071899.
(Continued)

*Primary Examiner* — Hal Kaplan
(74) *Attorney, Agent, or Firm* — Eschweiler & Potashnik, LLC

(57) ABSTRACT

The disclosure describes a voltage source inverter having an internal control loop with a setpoint input for a setpoint signal for an active power component of the inverter, and an actual value input for a current actual value of the active power component of the inverter. The inner control loop is a controller with a proportional component and an integral component and is configured to determine a frequency shift as a controller output variable from the difference between the setpoint signal and the current actual value. The inverter is configured to provide an AC voltage that deviates from a predefined fundamental frequency by the determined frequency shift. An outer control loop of the inverter is configured to supply a setpoint signal to the setpoint input as a function of the determined frequency shift in islanded operation. A power generation system can comprise two such inverters.

9 Claims, 6 Drawing Sheets

(51) Int. Cl.
*H02M 1/00* (2007.01)
*H02M 7/493* (2007.01)

(58) Field of Classification Search
USPC .............................................................. 307/82
See application file for complete search history.

(56) References Cited

U.S. PATENT DOCUMENTS

2022/0294229 A1 9/2022 Runge et al.
2023/0187942 A1 6/2023 Knobloch et al.

OTHER PUBLICATIONS

Laudahn Stefan et al. "Subsitution of synchronous generator based instantantaneous frequency control utilizing inverter-coupled DER" 2016 IEEE 7th International symposium on power electronic for distributed generation systems (PEDG), IEEE, Jun. 27, 2016 (Jun. 27, 2016), pp. 1-8.

Unruh Peter et al., "Overview on Grid-Forming Inverter control methods" Energies, vol. 13, No. 10, May 20, 2020 (May 20, 2020), p. 2589.

15
16
14
10
18
13
12
11
17

VOLTAGE SOURCE INVERTER AND POWER GENERATION SYSTEM

REFERENCE TO RELATED APPLICATIONS

This Application is a Continuation of International Application number PCT/EP2023/071899, filed on Aug. 8, 2023, which claims the benefit of German Application number 10 2022 119 897.9, filed on Aug. 8, 2022. The contents of the above-referenced Patent Applications are hereby incorporated by reference in their entirety.

FIELD

The disclosure relates to a voltage source inverter and a power generation system with such an inverter.

BACKGROUND

Voltage source inverters are becoming increasingly important in the context of the energy transition. One area of application for such inverters is the provision of an AC grid without a connection to a higher-level AC grid, as these inverters alone or together with other voltage source inverters are able to build up such a grid independently and operate it stably even with varying loads. If a group of voltage source inverters is to jointly operate an islanded grid without the need for complex communication between the individual inverters or the generation of a high-precision reference frequency, DE101 40 783 A1 proposes generating a target voltage as a reference, the frequency of which is determined by means of a frequency characteristic curve from a current active power and the amplitude of which is determined by means of a voltage characteristic curve from a current reactive power of the inverter. In addition, phase pre-control is provided in order to effectively suppress power oscillation between the inverters. The distribution of the reactive and active power between the inverters is defined by the relation between the stored characteristic curves.

However, there is also an increasing requirement for voltage source inverters to be able to be operated on a higher-level AC grid. In this situation, these inverters are able to spontaneously counteract fluctuations in the grid parameters frequency and amplitude and can thus contribute to the stability of the grid. It is desirable that the control of the inverter differs as little as possible from the control of an islanded grid when a higher-level grid is present, in order to enable smooth continuous operation of a sub-grid when it is disconnected from the higher-level grid. Furthermore, it is desirable that in the case of an islanded grid, a predeterminable power distribution between the inverters connected to the islanded grid is spontaneously established without communication and that the required total power is also spontaneously distributed among the existing inverters when individual inverters are switched on or off. If a higher-level grid is present, it should be possible to control the power of the individual inverters individually by means of setpoint specifications.

SUMMARY

Accordingly, it is the task of the present disclosure to demonstrate a voltage source inverter or a power generation system that fulfills these requirements.

A voltage source inverter according to the disclosure comprises an inner control loop with a setpoint input for receiving a setpoint signal for an active power component to be provided by the inverter and an actual value input for receiving a current actual value of a provided active power component of the inverter. The inner control loop comprises a controller with a proportional component and an integral component and is configured to determine a frequency shift as a controller output variable from the difference between the setpoint signal and the current actual value as a controller input variable. The inverter is further configured to provide an AC voltage that deviates from a predetermined fundamental frequency by the determined frequency shift at an output of the inverter at which the inverter can be connected to a distribution network.

The inverter according to the disclosure also comprises an outer control loop configured to supply a setpoint signal to the setpoint input in islanded operation as a function of the determined frequency shift. Through the interaction of the inner control loop and the outer control loop in islanded operation, the inverter is able to coordinate the active power to be provided with other inverters, if present, via the mediating variable of the frequency or the frequency shift, respectively, in order to meet the total active power requirement of the connected grid at all times and without further communication.

In grid-connected operation, the inverter is in one embodiment configured to supply an external signal to the setpoint input. This allows the active power provided by the inverter to be easily controlled via the external signal in grid-connected operation, so that a desired active power is supplied to a distribution grid.

In one embodiment, the inverter according to the disclosure additionally comprises a further internal control loop with a further setpoint input for receiving a further setpoint signal for a reactive power component to be provided by the inverter and a further actual value input for receiving a current actual value of the reactive power component provided, wherein the further internal control loop is a controller with a proportional component and an integral component and is configured to determine a voltage amplitude shift as a controller output variable from the difference between the further setpoint signal and the current actual value of the reactive power component to be provided as a controller input variable. In this case, the inverter is configured to provide an AC voltage at the output that deviates from a predefined fundamental amplitude by the determined voltage amplitude shift. Furthermore, the inverter comprises an outer control loop which is configured to supply a further setpoint signal to the further setpoint input as a function of the determined voltage amplitude shift in islanded operation.

Due to this additional controller structure, the inverter according to the disclosure can also provide reactive power as required in addition to active power in an islanded grid operation, wherein the controller structure also determines a reactive power share of the inverter according to the disclosure in the total reactive power requirement of the connected grid via the switching variable of the voltage amplitude without further communication between any other inverters that may be present.

In one embodiment, the outer control loop and/or the further outer control loop are configured as a proportional controller with a predefined proportional coefficient. This achieves a linear relationship between the respective controller input variables and controller output variables.

In one embodiment of the disclosure, the setpoint value and the actual value for the active power component provided and the setpoint value for the active power component to be provided are current values, so that the inner control loop comprises a current control.

A further aspect of the disclosure relates to a power generation system comprising a first inverter with the properties described above and a second inverter with the properties described above, which is connected in parallel with the first inverter on the AC side, wherein a central controller supplies individual setpoint signals to the inverters at their setpoint inputs in a grid-connected mode and also supplies status signals in order to switch the inverters between a grid-connected mode and an islanded mode. It is conceivable here that the individual setpoint signals are supplied in grid-connected operation. In one embodiment of the islanded operation, the setpoint signals can be omitted so that the two inverters independently coordinate the required distribution of the power components to be provided via the switching variables frequency and voltage amplitude. However, it is also conceivable that at least one of the inverters continues to receive setpoint signals and adjusts its power provision accordingly. For example, the central control system can continue to supply the inverters with individual frequency shift signals, wherein the inverters are configured to adjust their fundamental frequency according to the frequency shift signal supplied to them.

Alternatively or additionally, the central controller can also supply the inverters with individual voltage amplitude shift signals, wherein the inverters are configured to adjust their fundamental amplitude according to the voltage amplitude shift signal supplied to them.

In one embodiment, the central controller can also supply the inverters with individual coefficient values, wherein the inverters are configured to adjust their proportional coefficients used in their outer control loop according to the coefficient value supplied to them. In this way, the central controller can influence the distribution of the total power component to be provided among the participating inverters.

BRIEF DESCRIPTION OF THE FIGURES

In the following, the disclosure is illustrated with the aid of figures, of which is shown in FIG. 1 is a schematic structure of an energy generation system according to the disclosure.

DETAILED DESCRIPTION

Figure 1:
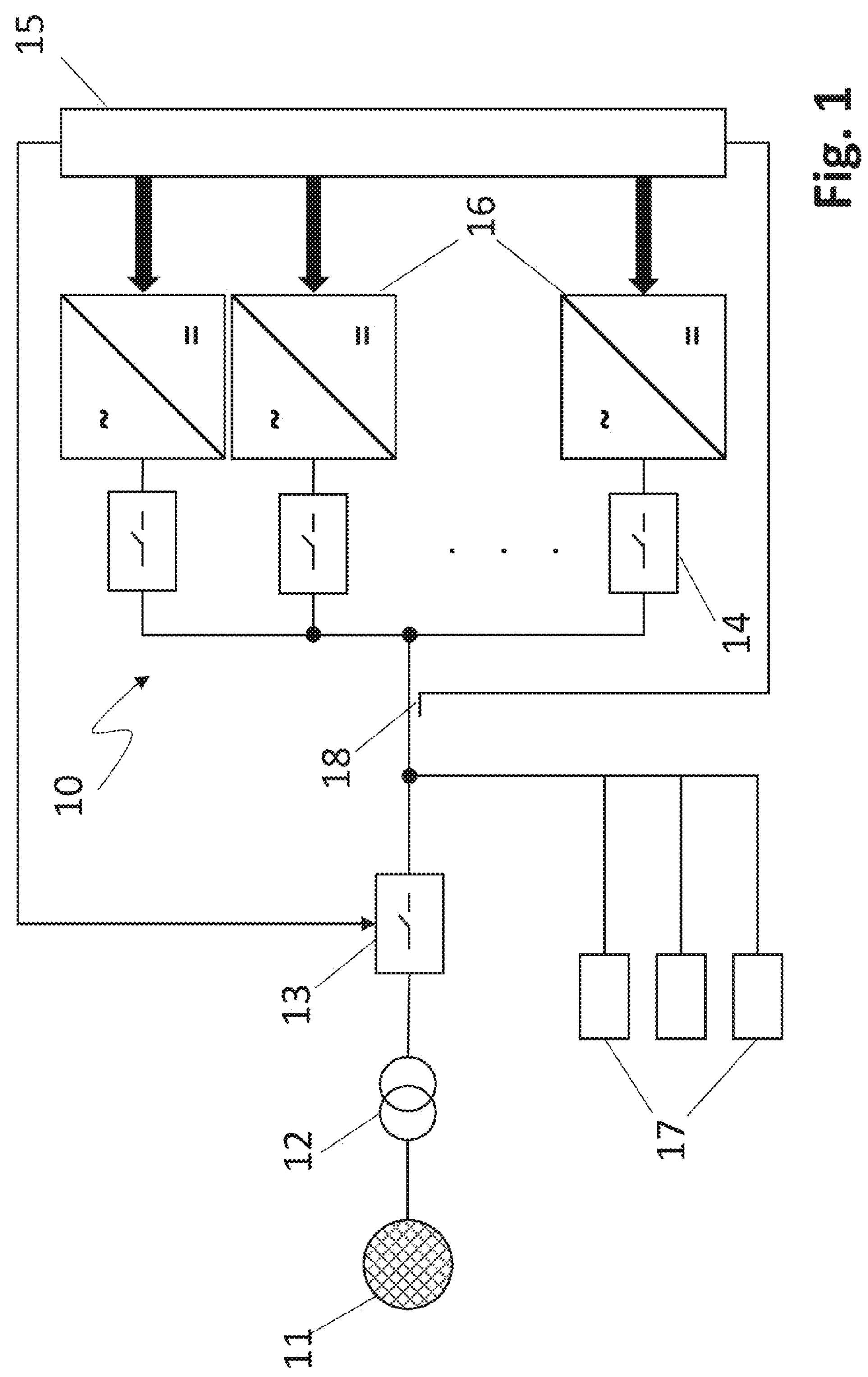

FIG. 1 shows a structure of a power generation system 10 according to the disclosure, which has a plurality of voltage source inverters 16 that are connected to a control circuit 15 by means of communication, so that control signals can be transmitted from the control circuit 15 to the inverters 16, but also signals can be transmitted in the opposite direction, if necessary.

The inverters 16 are each connected to a common distribution grid via disconnectors 14 in order to exchange power with this grid, for example, to provide active power and reactive power. The distribution grid, to which further loads 17 can be connected, is in turn connected to a higher-level grid 11, for example, a medium-voltage grid, via a grid disconnector 13 and a transformer 12.

By using voltage source inverters 16 with sufficient power capacity and corresponding connected sources, for example, PV generators or batteries, it is possible to reliably supply the loads 17 with power via the common distribution grid even when the grid disconnector 13 is opened, so that the common distribution grid is separated from the higher-level grid 11. In this case, the inverters 16 jointly ensure stable electrical parameters, for example, voltage and frequency, within the permissible value range. The grid disconnector 13 can be actuated manually or by the control circuit 15. The control circuit 15 may also transmit individual setpoint specifications as well as status signals to the inverters 16, for example, a signal indicating whether the common distribution grid is connected to the higher-level grid 11. For this purpose, the control circuit 15 monitors the grid status with a suitable sensor 18 or the control circuit 15 may also actively influence the grid status by activating the grid disconnector 13 or passively determine it by monitoring the switching status of the grid disconnector 13.

Figure 2:
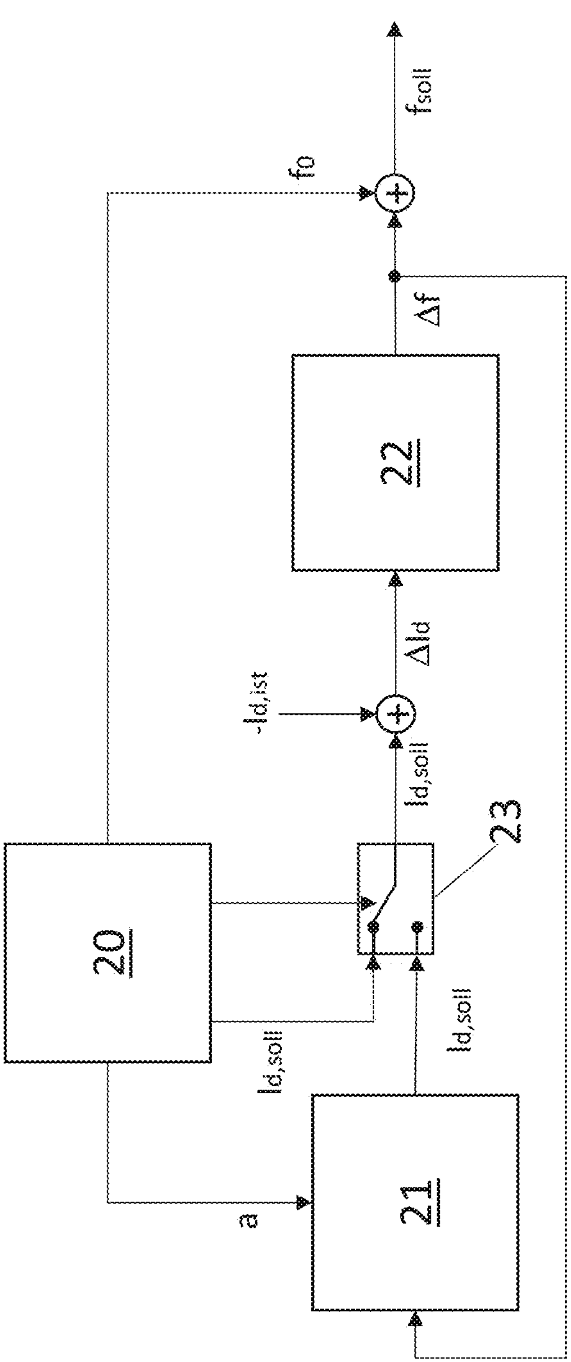
FIG. 2 is a version of a controlled system for the provision of active power in an inverter according to the disclosure.

FIG. 2 shows a controller (e.g., control circuit 15) structure for the provision of active power in an inverter according to one embodiment of the disclosure. The description of the mode of operation of the controller structure begins under the assumption that a presetting circuit or unit 20, which can be a component of the control circuit 15 shown in FIG. 1, feeds an individual setpoint specification $I_{d,soll}$ into the controller structure and actuates a status switch 23 in such a way that this setpoint specification $I_{d,soll}$ is compared with an actual value $I_{d,ist}$ and a difference $\Delta I_d$ between the two variables is transmitted to an inner control circuit 22 as an input variable. In this case, the setpoint specification $I_{d,soll}$ and the actual value $I_{d,ist}$ are values of a co-system component of the current amplitude provided by the inverter, but can alternatively also be other electrical variables characterizing the active power to be provided or provided.

The inner controller 22 is, in one embodiment, configured as a proportional-integral controller and provides a frequency deviation $\Delta f$ as an output variable by which a frequency $f_{soll}$ set by the inverter at its output deviates from a fundamental frequency $f_0$. The fundamental frequency $f_0$ is provided here by the presetting unit 20, but can also be a predefined fixed value. Since the frequency $f_{ssoll}$ set by the inverter in turn has a direct effect on the actual value $I_{d,ist}$, the inner controller 22 acts to ensure that the set frequency deviation $\Delta f$ leads to an actual value $I_{d,ist}$ that corresponds to the setpoint value $I_{(d,soll)}$. With the control of the status switch 23 assumed above, the inner controller 22 therefore causes the inverter to comply with the setpoint value $I_{d,soll}$ specified by the presetting circuit or unit 20.

In the case that the presetting circuit or unit 20 controls the status switch 23 in such a way that the setpoint $I_{d,soll}$ is not specified by the presetting circuit or unit 20 but by an output variable of an outer controller 21, this results in a different behavior of the inverter. In this case, the outer controller 21 uses the deviation $\Delta f$ of a frequency currently set by the inverter from a predefined fundamental frequency $f_0$ to determine a setpoint value for the variable $I_{d,soll}$, which is compared with the actual value $I_{d,ist}$ (selected by switch 23) instead of a variable generated by the presetting circuit or unit 20 and the difference of which is transmitted to the inner control circuit 22 as an input variable. The outer control circuit 21 is in one embodiment configured as a purely proportional controller, so that the setpoint value is linearly dependent on the frequency deviation $\Delta f$ with a proportionality coefficient a within permissible controller limits. In FIG. 2, this coefficient a is transmitted by the presetting circuit or unit 20 in a variable manner, but can also be a predefined fixed value. A variation of the coefficient a enables the presetting circuit or unit 20 to preset different values for the coefficient a, as well as different values for the fundamental frequency $f_0$, to different inverters that are connected to the presetting circuit or unit 20 and thus to influence a proportional distribution of a total active power to be provided by the inverters. This will be discussed in more detail below in conjunction with FIG. 5.

The controller structure with the inner control circuit 22, the outer control circuit 21 and the status switch 23 are components of an inverter.

Figure 3:
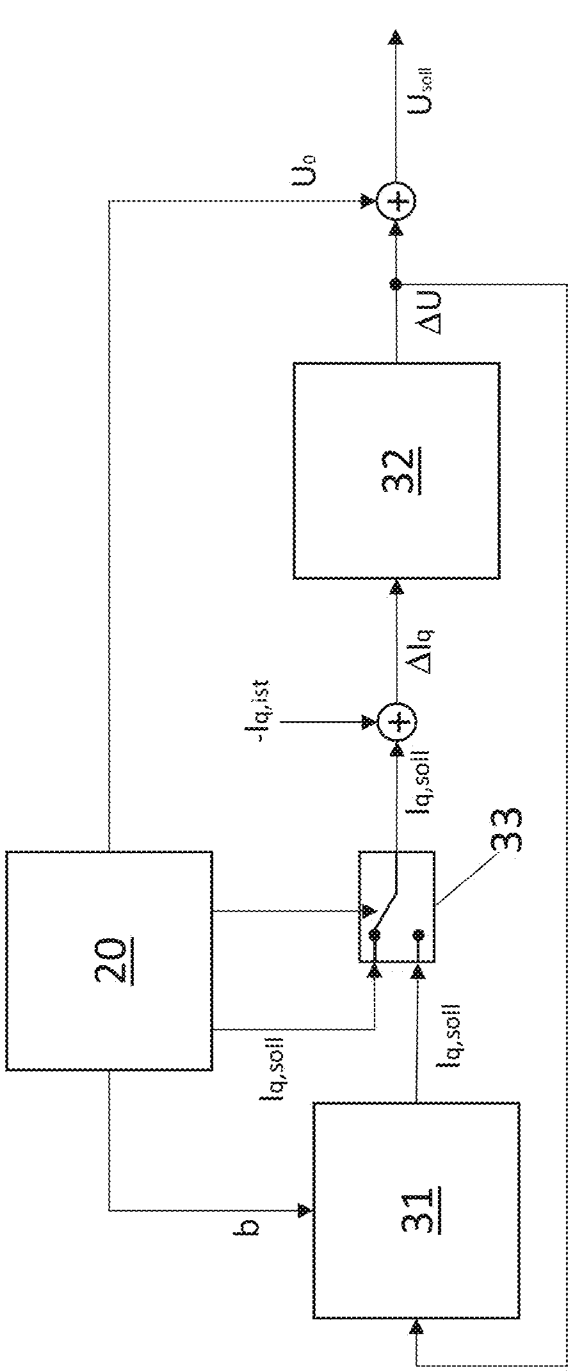
FIG. 3 is a version of a controlled system for the provision of reactive power in an inverter according to the disclosure.

FIG. 3 shows a further, similarly configured controller structure for the provision of reactive power in an inverter according to the disclosure. The description of the mode of operation of the controller structure also begins here under the assumption that a presetting circuit or unit 20, which can be a component of the control circuit 15 shown in FIG. 1, feeds an individual setpoint specification $I_{q,soll}$ into the controller structure and controls a state switch 33 in such a way that this setpoint specification $I_{q,soll}$ is compared with an actual value $I_{q,ist}$ and a difference $\Delta I_q$ between the two variables is transmitted as an input variable to an inner controller 32. In this case, the setpoint specification $I_{q,soll}$ and the actual value $I_{q,ist}$ are values of a negative sequence component of the current amplitude provided by the inverter, but can alternatively also be other electrical variables characterizing the active power to be provided or provided.

The inner control circuit 32 is also configured in one embodiment as a proportional-integral controller and provides as an output variable a deviation $\Delta U$ of a voltage amplitude by which a voltage $U_{set}$ provided by the inverter at its output deviates from a fundamental voltage $U_0$. The fundamental voltage $U_0$ is provided here by the presetting circuit or unit 20, but can also be a predefined fixed value. Since the voltage amplitude $U_{soll}$ set by the inverter in turn has a direct effect on the actual value $I_{q,ist}$, the inner control circuit 32 acts to ensure that the set deviation $\Delta U$ of the voltage amplitude leads to an actual value $I_{q,ist}$ that corresponds to the setpoint value $I_{q(,soll)}$. With the control of the status switch 33 assumed above, the inner control circuit 32 therefore causes the inverter to comply with the setpoint value $I_{q,soll}$ specified by the presetting circuit or unit 20.

If the presetting circuit or unit 20 controls the status switch 33 in such a way that the setpoint value $I_{q,soll}$ is not specified by the presetting circuit or unit 20 but by an output variable of an outer control circuit 31, the inverter behaves differently. In this case, the outer control circuit 31 uses the deviation $\Delta U$ of a voltage amplitude currently provided by the inverter from a predetermined fundamental voltage $U_0$ to determine a setpoint for the variable $I_{q,soll}$, which is compared with the actual value $I_{q,ist}$ instead of a variable generated by the presetting circuit or unit 20 and the difference of which is transferred from the input variable to the inner control circuit 32. The outer control circuit 31 is in one embodiment configured as a purely proportional controller, so that within permissible controller limits the setpoint value is linearly dependent on the deviation $\Delta U$ of the voltage amplitude with a proportionality coefficient b. In FIG. 3, this coefficient b is transmitted by the presetting circuit or unit 20 in various ways, but may also be a predefined fixed value. A variation of the coefficient b enables the presetting circuit or unit 20 to specify different values for the coefficient b, as well as different values for the fundamental voltage $U_0$, to different inverters that are connected to the presetting circuit or unit 20 and thus to influence a proportional distribution of a total reactive power to be provided by the inverters.

Figure 4:
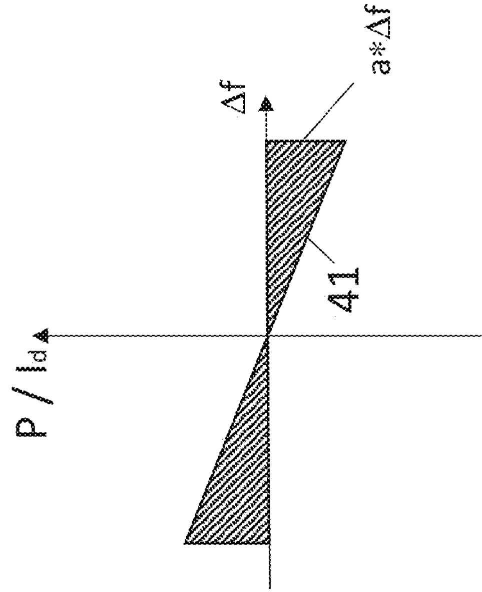
FIG. 4 is a graph showing an example characteristic curve stored in a proportional controller of the controlled system.

FIG. 4 shows a characteristic curve 41 of the outer controller 21 from FIG. 2. A frequency deviation $\Delta f$ is plotted on the x-axis as an input variable of the outer controller 21. The resulting setpoint value, which can be a current amplitude $I_d$ in the positive sequence system or another controlled variable P corresponding to an active power to be provided by the inverter comprising the outer controller 21, varies linearly with the coefficient a as a function of the frequency deviation $\Delta f$. Accordingly, the outer controller 31 of FIG. 3 can be configured in such a way that a controlled variable Q linked to a reactive power to be provided by the inverter comprising the outer controller 31, for example, a negative sequence component $I_q$ of the current amplitude, is set as the output variable of the outer control circuit 31 linearly with the coefficient b as a function of a deviation $\Delta U$ of the voltage amplitude from a fundamental voltage $U_0$.

Figure 5:
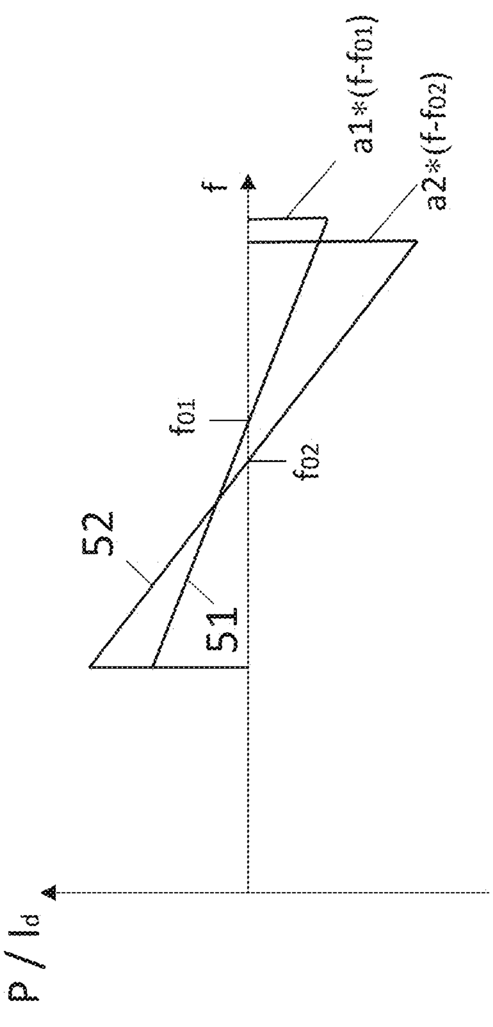
FIG. 5 is a graph showing differently parameterized characteristic curves of two inverters in a power generation system according to the disclosure, and FIG. 6 a time curve of the power provided by two inverters according to the disclosure in an operating scenario.

In order to explain the influence of the values of the coefficient a and the fundamental frequency $f_0$, which may be preset in various ways by the presetting circuit or unit 20, on a distribution of a total active power to be provided between two inverters, FIG. 5 shows an example of a first characteristic curve 51 of a current amplitude $I_d$ in the positive sequence system or of another controlled variable P of a first inverter, which corresponds to an active power to be provided and to which the values a1 as the coefficient of the outer control circuit and the fundamental frequency $f_{01}$ are preset. Correspondingly, a second characteristic curve 52 of a current amplitude $I_d$ in the positive sequence system or of another controlled variable P of a second inverter linked to an active power to be provided is shown, to which the values a2 as the coefficient of the outer control circuit and the fundamental frequency $f_{01}$ are specified. In this way, it is possible to define frequency ranges in which the majority of the active power is provided by the first inverter and frequency ranges in which the majority of the active power is provided by the second inverter. Of course, this distribution can also be variable in terms of time and, for example, can be made dependent on current operating conditions such as a bridge temperature or the state of charge of a storage unit connected to the respective inverter. In a similar way, the distribution of a reactive power to be provided between inverters can also be flexibly designed by variable specifications of coefficients b1,2, . . . n and fundamental voltage $U_{01,02, \ldots 0n}$ between two or more inverters.

Figure 6:
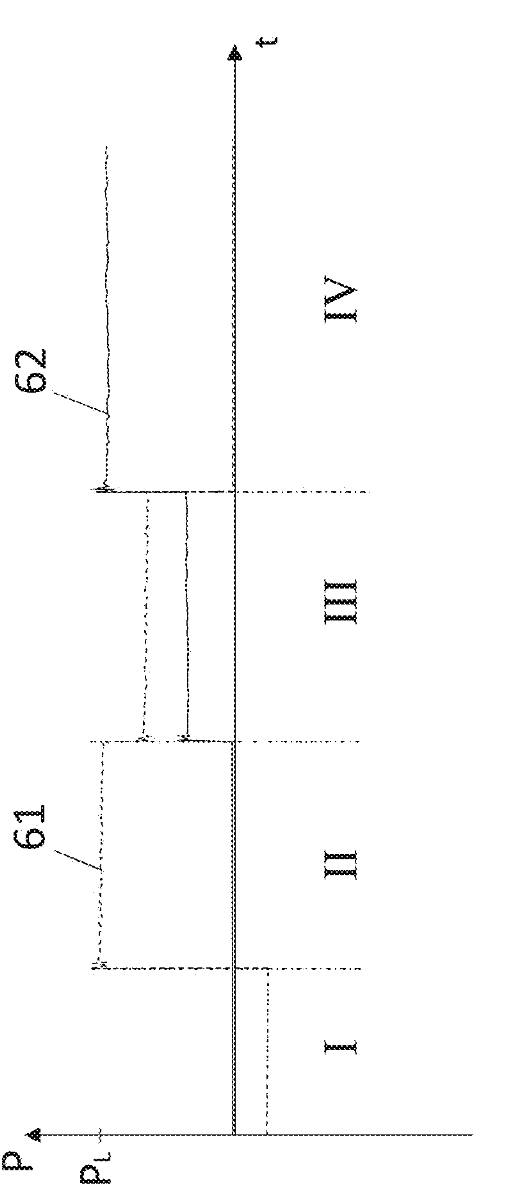

In FIG. 6, the mode of operation of an embodiment according to the disclosure is illustrated by means of a first time curve 61 (dashed line) of an active power P provided by a first inverter according to the disclosure and a second time curve 62 (solid line) of an active power P provided by a second inverter according to the disclosure. In a first time period I, an islanded grid is provided solely by the first inverter, with excess energy in the islanded grid being used to charge a storage device connected to the first inverter. In the second time period II, a load in the islanded grid requires an operating power $P_L$, which is provided solely by the first inverter. At the beginning of the third time period III, the second inverter is switched on while the load demand remains unchanged. After a short transition, the load demand is divided between the inverters according to the coefficients a1, a2 of the outer control circuit stored in the two inverters and the stored fundamental frequencies $f_{(01)}$, $f_{02}$. At the beginning of the fourth time period IV, the first inverter is switched off while the load demand remains unchanged. The second inverter immediately takes over the full operating load $P_L$ so that continuous operation of the islanded grid is ensured even if individual inverters are switched on or off without the need for communication.

What is claimed is:

1. A voltage source inverter, comprising:

an inner control loop comprising a setpoint input configured to receive a setpoint signal comprising one of a first setpoint signal and a second setpoint signal for an active power component within the voltage source inverter, and an actual value input configured to receive a actual value of the active power component of the voltage source inverter, the inner control loop comprising a control circuit comprising a proportional circuit component and an integral circuit component and wherein the control circuit is configured to determine a frequency shift as a control output variable from a difference between the setpoint signal and the actual value, wherein the voltage source inverter is configured to provide an AC voltage which deviates from a predetermined fundamental frequency by the determined frequency shift, and an outer control loop configured to supply the second setpoint signal to the setpoint input as a function of the determined frequency shift in an islanded operation of a power generation system containing the voltage source inverter.

2. The voltage source inverter according to claim 1, wherein the voltage source inverter is configured to supply an external signal as the first setpoint signal to the setpoint input in a grid-connected operation of the power generation system containing the voltage source inverter.

3. The voltage source inverter according to claim 1, wherein the voltage source inverter further comprises:

a further inner control loop with a further setpoint input configured to receive a further setpoint signal comprising one of a first further setpoint signal and a second further setpoint signal for a reactive power component to be provided by the voltage source inverter, and a further actual value input configured to receive a further actual value of the provided reactive power component, wherein the further inner control loop comprises a further control circuit with a proportional circuit component and an integral circuit component and wherein the further control circuit is configured to determine a voltage amplitude shift as a control output variable from the difference between the further setpoint signal and the further actual value of the reactive power component to be provided as a control input variable, wherein the voltage source inverter is configured to provide an AC voltage which deviates from a predetermined fundamental amplitude by the determined voltage amplitude shift, and a further outer control loop which is configured to supply the second further setpoint signal to the further setpoint input in the islanded operation as a function of the determined voltage amplitude shift.

4. The voltage source inverter according to claim 3, wherein the outer control loop and/or the further outer control loop are configured as a proportional control circuit with a predetermined proportional coefficient.

5. The voltage source inverter according to claim 1, wherein a value of the first setpoint signal and the actual value for the provided active power component and a value of the second setpoint signal for the provided active power component are current values, so that the inner control loop comprises a current control.

6. A power generation system, comprising:

a first voltage source inverter and a second voltage source inverter, each comprising:

an inner control loop comprising a setpoint input configured to receive a setpoint signal comprising one of a first setpoint signal and a second setpoint signal for an active power component within the respective voltage source inverter, and an actual value input configured to receive a actual value of the active power component of the voltage source inverter, the inner control loop comprising a control circuit comprising a proportional circuit component and an integral circuit component and wherein the control circuit is configured to determine a frequency shift as a control output variable from a difference between the setpoint signal and the current actual value, wherein the voltage source inverter is configured to provide an AC voltage which deviates from a predetermined fundamental frequency by the determined frequency shift, and—an outer control loop configured to supply the second setpoint signal to the setpoint input as a function of the determined frequency shift in an islanded operation of a power generation system containing the voltage source inverter, wherein the second voltage source inverter is connected in parallel with the first voltage source inverter on an AC side thereof, wherein the control circuit is common to both the first and second voltage source inverters and supplies individual setpoint signals to the first and second voltage source inverters at their respective setpoint inputs in a grid-connected operation of the power generation system, and further supplies status signals in order to switch the first and second voltage source inverters between a grid-connected operation and an islanded operation of the power generation system.

7. The power generation system according to claim 6, wherein the control circuit further supplies the first and second voltage source inverters with individual frequency shift signals, wherein the first and second voltage source inverters are configured to adjust their fundamental frequency in accordance with the respective frequency shift signal supplied thereto.

8. The power generation system according to claim 6, wherein the control circuit further supplies the first and second voltage source inverters with individual voltage amplitude shift signals, wherein the first and second voltage source inverters are configured to adjust their fundamental amplitude according to the respective voltage amplitude shift signal supplied thereto.

9. The power generation system according to claim 6, wherein the control circuit further supplies individual coefficient values to the first and second voltage source inverters, wherein the first and second voltage source inverters are configured to adjust their respective proportional coefficients used in their respective outer control loop according to the respective coefficient value supplied thereto.

* * * * *